United States Patent
Eisenhuth et al.

(10) Patent No.: US 11,884,190 B2
(45) Date of Patent: Jan. 30, 2024

(54) VEHICLE SEAT

(71) Applicant: Magna Seating (Germany) GmbH, Sailauf (DE)

(72) Inventors: Siegfried Eisenhuth, Amt Creuzburg (DE); Bozena Gorowska, Neuburg a. d. Donau (DE); Renato Martic, Munich (DE); Markus Braunsdorf, Hallbergmoos (DE)

(73) Assignee: Magna Seating (Germany) GmbH, Sailauf (DE)

( * ) Notice: Subject to any disclaimer, the term of this patent is extended or adjusted under 35 U.S.C. 154(b) by 0 days.

(21) Appl. No.: 17/817,013

(22) Filed: Aug. 3, 2022

(65) Prior Publication Data
US 2023/0048263 A1   Feb. 16, 2023

(30) Foreign Application Priority Data
Aug. 11, 2021 (DE) .................. 102021208805.8

(51) Int. Cl.
*B60N 2/28* (2006.01)
*B60N 2/60* (2006.01)

(52) U.S. Cl.
CPC .......... *B60N 2/2893* (2013.01); *B60N 2/6018* (2013.01)

(58) Field of Classification Search
CPC .................... B60N 2/2893; B60N 2/6018
See application file for complete search history.

(56) References Cited

U.S. PATENT DOCUMENTS

| | | | |
|---|---|---|---|
| 9,981,581 B2 * | 5/2018 | Okuhara | B60N 2/2887 |
| 2017/0259709 A1 * | 9/2017 | Shibuya | B60N 2/2893 |
| 2018/0118065 A1 | 5/2018 | Okuhara et al. | |
| 2019/0291612 A1 | 9/2019 | Nishida | |
| 2021/0046853 A1 * | 2/2021 | Haeussler | B60N 2/2887 |

FOREIGN PATENT DOCUMENTS

| | | |
|---|---|---|
| DE | 102010032378 A1 | 2/2012 |
| DE | 102012018986 A1 | 1/2014 |
| DE | 202014008592 U1 | 2/2016 |
| DE | 102015005374 A1 | 9/2016 |
| DE | 102018203311 A1 | 9/2019 |
| DE | 102019208486 A1 | 12/2020 |
| EP | 1325838 A1 | 7/2003 |
| JP | 2000296733 A | 10/2000 |
| JP | 2017071355 A | 4/2017 |

* cited by examiner

*Primary Examiner* — Anthony D Barfield
(74) *Attorney, Agent, or Firm* — Dickinson Wright PLLC

(57) ABSTRACT

The invention relates to a vehicle seat comprising a seat surface and a backrest. The seat surface and the backrest comprise, in particular, a seat cover which forms a surface of the seat surface and the backrest. Two fastening means which are spaced apart in the transverse direction are attached to the backrest or the seat surface, an additional device, in particular a child seat, being able to be attached thereby to the vehicle seat. Advantageously the fastening means are attached at a transition between the seat surface and the backrest. If the fastening means are not required for attaching the additional device, the fastening means may be covered. To this end, the vehicle seat comprises a covering element which is configured to be strip-shaped.

11 Claims, 3 Drawing Sheets

VEHICLE SEAT

CROSS-REFERENCE TO RELATED APPLICATIONS

This application claims priority to German Application No. DE 102021208805.8 filed Aug. 11, 2021. The entire disclosure of the above application is incorporated herein by reference.

FIELD OF THE INVENTION

The invention relates to a vehicle seat and, in particular, to a vehicle seat having a covering element for a holding device for attaching an additional device, in particular, a child seat. The invention further relates to a vehicle comprising such a vehicle seat.

BACKGROUND OF THE INVENTION

This section provides information related to the present disclosure which is not necessarily prior art.

It is known from the prior art to fasten child seats according to ISO 13216 to vehicle seats of the second seat row. To this end, mounting brackets have to be provided as mounting points on the vehicle seat, corresponding counter elements of the child seats being able to engage therein in order to attach the child seat in this manner to the vehicle seat. These attachments of the child seats are denoted as so-called "ISOFIX" fastening systems. The mounting points are often visible when not in use and disrupt the overall impression, for example, of a rear seat bench covered in high-quality leather.

In order to cover the mounting brackets/fastening elements or the mounting points and to achieve a visually attractive overall impression, covering caps made of plastics are known. For example, DE 10 2006 019 738 A1 discloses such a covering. Covering caps may be removable but then pose a significant risk of being lost. Alternatively, the covering caps may be foldable and remain on the vehicle seat, wherein the clearance angle of the counter element of the child seat is then limited.

An alternative to the covering caps is disclosed in DE 10 2010 032 378 A1. Here the mounting points are arranged to the rear of a closable opening, wherein the closable opening is implemented by means of a concealed zip fastener. Whilst this embodiment provides a visually attractive design, it is nevertheless time-consuming and costly in terms of manufacture.

SUMMARY OF THE INVENTION

This section provides a general summary of the disclosure, and is not a comprehensive disclosure of its full scope or all of its features.

It is the object of the invention to provide a vehicle seat which permits a simple covering and uncovering of the mounting points/mounting brackets for additional devices, with simple and cost-effective manufacture. In particular, by means of the aforementioned covering the vehicle seat is designed to have a visually attractive and high-quality appearance.

This object is achieved by a vehicle seat comprising: a seat surface and a backrest, wherein the seat surface and the backrest comprise a seat cover with a seat outer skin; a holding device which is rigidly arranged on the vehicle seat for releasably attaching an additional device, in particular a child seat, wherein the holding device comprises two fastening elements; openings in the seat surface or the backrest for reaching the fastening elements; a covering element which is configured to be strip-shaped and which comprises two short side edges and a first and a second long side edge, wherein the covering element is of multi-layered construction and has at least one first outer face which is designed from the same material as the seat outer skin of the vehicle seat, wherein the covering element is unreleasably attached via a first side edge to the backrest, such that the covering element is able to be selectively brought into a position for covering the fastening means (covering position) and into a position for uncovering the fastening means (uncovering position) and the openings, wherein the covering element is unreleasably attached via the first long side edge by means of a transverse seam to the seat outer skin or the seat cover on the seat surface or the backrest, and wherein the transverse seam forms a pivot axis for the covering element; and a tab-shaped element is attached to at least one of the short outer edges about a pivot axis, such that in the covering position this tab-shaped element is able to be pivoted about the short outer edge into a first position and is able to be inserted into a channel or slot in the backrest or seat surface or between the backrest and/or seat surface for the releasable fixing of the covering element, and in that in the uncovering position the tab-shaped element is able to be pivoted into a second position and is able to be inserted into a channel or slot in the backrest or seat surface or between the backrest and/or seat surface for the releasable fixing of the covering element.

The object is thus achieved by a vehicle seat comprising a seat surface and a backrest. The seat surface and the backrest comprise, in particular, a cover which forms a surface of the seat surface and the backrest. Two fastening means which are spaced apart in the transverse direction are attached to the backrest or the seat surface, an additional device, in particular a child seat, being able to be attached thereby to the vehicle seat.

Advantageously, the fastening means are attached at a transition between the vehicle seat and the vehicle backrest. If the fastening means are not required for attaching the additional device, the fastening means may be covered. To this end, the vehicle seat comprises a covering element which is configured to be strip-shaped.

The covering element is dimensioned such that the openings in the seat surface or the backrest, which permit the two fastening means to be reached, are able to be fully covered.

The covering element is unreleasably attached to the seat cover on the backrest or the seat surface so as to be selectively pivotable about a transverse seam forming a transverse axis S1, into a position for covering and into a position for uncovering the fastening means. The covering element comprises, at least on one edge region, a tab-shaped element which permits the covering element to be fixed in the position for covering and in the position for uncovering the fastening element. It is provided that the strip-shaped covering element has a surface made of the same material as the surface of the seat surface and/or the seat backrest.

Thus, it is preferably provided that the covering element has a cover which is identical to the cover of the seat surface and/or the backrest. Thus the holding device or the fastening means may be reliably covered when not in use. The fastening means are thus protected from external influences. Similarly, a simple uncovering of the fastening means is provided. Thus the strip-shaped covering element may be easily removed from the fastening means so that access to the fastening means is possible in an unrestricted manner.

Particularly advantageously, a continuous homogenous appearance is ensured, so that the covering element does not visually stand out relative to the seat surface and/or the backrest. This also simplifies the manufacture of the covering element, since the same material may be used for producing the surface of the covering element as is used for the surfaces of the seat surface and/or backrest. In particular, the same cover may be used as that which is already attached to the seat surface or the backrest.

The tab-shaped element is attached to an outer edge of the covering element about a pivot axis (S2). The pivot axis S2 runs about a vertical axis.

The backrest or the seat surface have two openings which in each case open into a receiving channel. The openings serve for reaching the fastening means. The openings are arranged spaced apart from one another in the transverse direction and are able to be fully covered by the strip-shaped covering element. Thus the fastening means are not able to be seen when the covering element is arranged in the covering position. This leads to a reliable protection of the fastening means and to a high-quality visual impression. Since the surface regions of the seat outer skin of the seat surface and/or backrest and the surface of the covering element are the same, a homogenous overall appearance of the vehicle seat is provided.

Due to the unreleasable attachment of the covering element to the backrest via a first side edge, it is ensured that the covering element is not able to be lost. At the same time, the fastening means may be uncovered in a simple manner with little effort.

It is particularly advantageously provided that the first end of the covering element is pivotably attached to the backrest. Thus the fastening means may be uncovered by the covering element being pivoted upwardly at the first end relative to the backrest about an axis running in the transverse direction. As a result, it is possible in particular to transfer the covering element into a non-disruptive position if the fastening means is required for attaching the additional device. A fixing of the covering element in the "uncovering" position may be achieved by the tab-shaped element being attached to the lateral edge region.

The tab-shaped element is pivotably attached to the edge region of the covering element and may also be pivoted into a second position in which the covering element may also be fixed in the "covering position" on the vehicle seat. Thus the fastening means is prevented from being inadvertently uncovered. The covering element in this case is able to be fixedly clamped by means of the tab-shaped element in a channel/slot between adjacent backrest elements or between the side region of the backrest and a side support of the backrest. The channel may, in particular, be a fixing channel of the vehicle seat.

Thus, no additional fastening element is required for fixing the covering element in the covering position. At the same time, it is achieved that the fastening of the covering element may be released in a simple manner and with little expenditure of force when the fastening means is intended to be uncovered. To this end, the user only has to pull on the lower edge region and pivot the covering element upwardly into the "uncovering position". The inserted tab-shaped element in this case may be released from the fixing slot and pivots therewith.

The covering element in the "uncovering position", in the position provided for uncovering the fastening means, is able to be clamped in a slot of the vehicle seat and/or the backrest. Said slot may be, in particular, a channel. Similarly, the slot may be formed by an abutment of two different sub-elements of the vehicle seat or even formed by a sub-element of the vehicle seat and an adjacent element on the vehicle body side.

In an alternative embodiment, the covering element is unreleasably attached to the seat cover on the seat surface via a transverse seam.

Finally, the invention relates to a vehicle. The vehicle is, in particular, a passenger motor vehicle. The vehicle comprises a vehicle seat as described above. Thus, the vehicle has a homogenous interior when the covering element covers the fastening means.

Additionally, the fastening means are able to be covered and uncovered in a simple manner with little effort.

The x, y, z-direction corresponds to the directions of a conventional vehicle coordinate system in which x is the vehicle longitudinal direction, y is the transverse direction and z is the vertical direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION OF THE INVENTION

Figure 1:
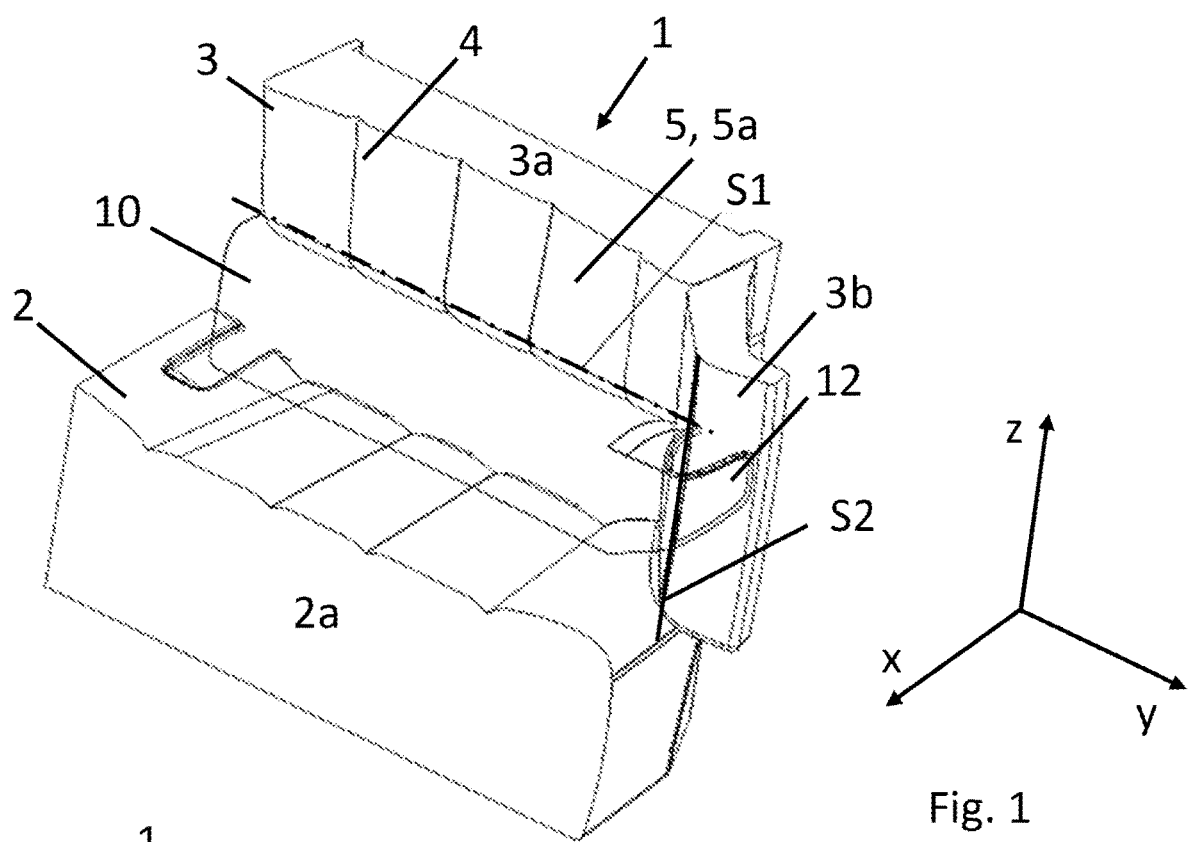
FIG. 1 shows a first perspective view of a portion of a vehicle seat according to an exemplary embodiment of the invention in a "covering position" of the covering element.

The vehicle seat 1 comprises a backrest 3 with a backrest padding 3a and side supports 3b and a seat surface 2 with a seat padding 2a. The backrest padding 3a and the seat padding 2a substantially have a padding made of a foam material and are covered with a seat cover 4.

The seat cover 4 is generally designed as composite material and produced in a lamination method. The seat cover comprises a seat outer skin 5 with a surface region 5a, as well as a lamination on the surface region 5a of the seat outer skin 5 facing away therefrom. The surface region 5a of the seat outer skin 5 forms in this case the visible face V for the user. The seat outer skin 5 may consist, for example, of a leather material, textile material, synthetic leather, microfibre, whilst the lamination may comprise a textile fabric. The lamination may also be designed to be multi-layered.

A holding device 6 for fastening a child seat is provided on the backrest 3, in particular in a transition region between the seat surface 2 and backrest 3. This holding device 6 consists of two fastening means arranged spaced apart in the transverse direction. Each fastening means, in particular, is an eye or a bracket according to ISO 13216 and received within the backrest 3 in receiving channels 8a and held so as to be attached therein and fixed to the structure. As may be identified from the perspective views, openings 8 which open into the receiving channels 8a and which permit access to the fastening means are incorporated in the backrest 3. The receiving channels or the openings 8 are configured to run in the lower edge region of the backrest 3 in the x-direction, such that the front outer edges thereof terminate flush with the front face V of the backrest 3. The fastening means are attached—generally welded—to a seat structural element, not shown, of the vehicle seat and are accessible via the openings 8 in the backrest 3 and the receiving channels 8a for fastening the counter elements of the child seat. The fastening means are not visible in the figures shown.

The vehicle seat 1 also has a covering element 10. The covering element 10 serves for selectively covering and uncovering the fastening means or the openings 8. The openings or receiving channels 8a are frequently also denoted as ISOFIX openings.

In FIG. 1 it is shown how the covering element 10 fully covers the fastening means of the holding device 6. This position of the covering element 10 is denoted hereinafter as the "covering position".

Figure 2:
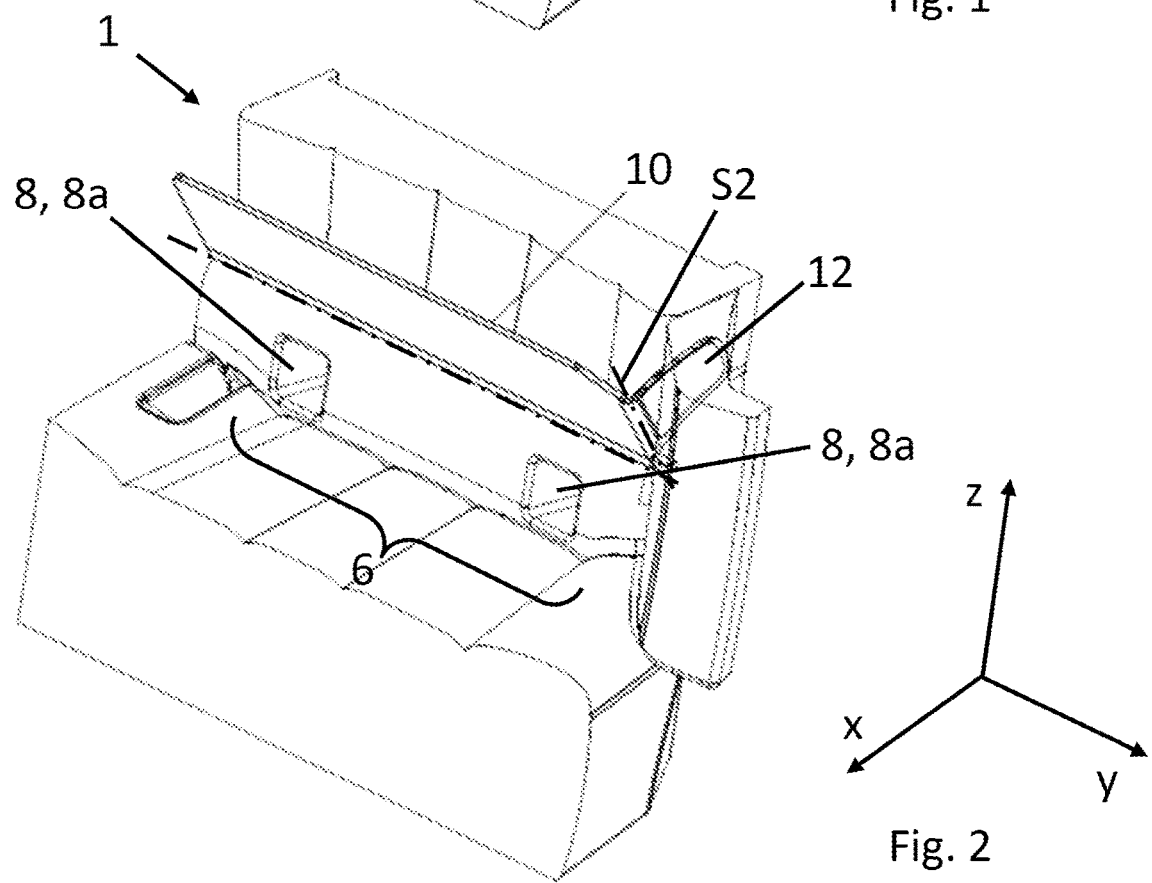
FIG. 2 shows the first perspective view of the portion of the vehicle seat according to the exemplary embodiment of the invention in an "uncovering position" of the covering element.

In FIG. 2 it is shown how the covering element 10 fully uncovers the fastening means. This position of the covering element 10 is denoted hereinafter as the "uncovering position".

Figure 3:
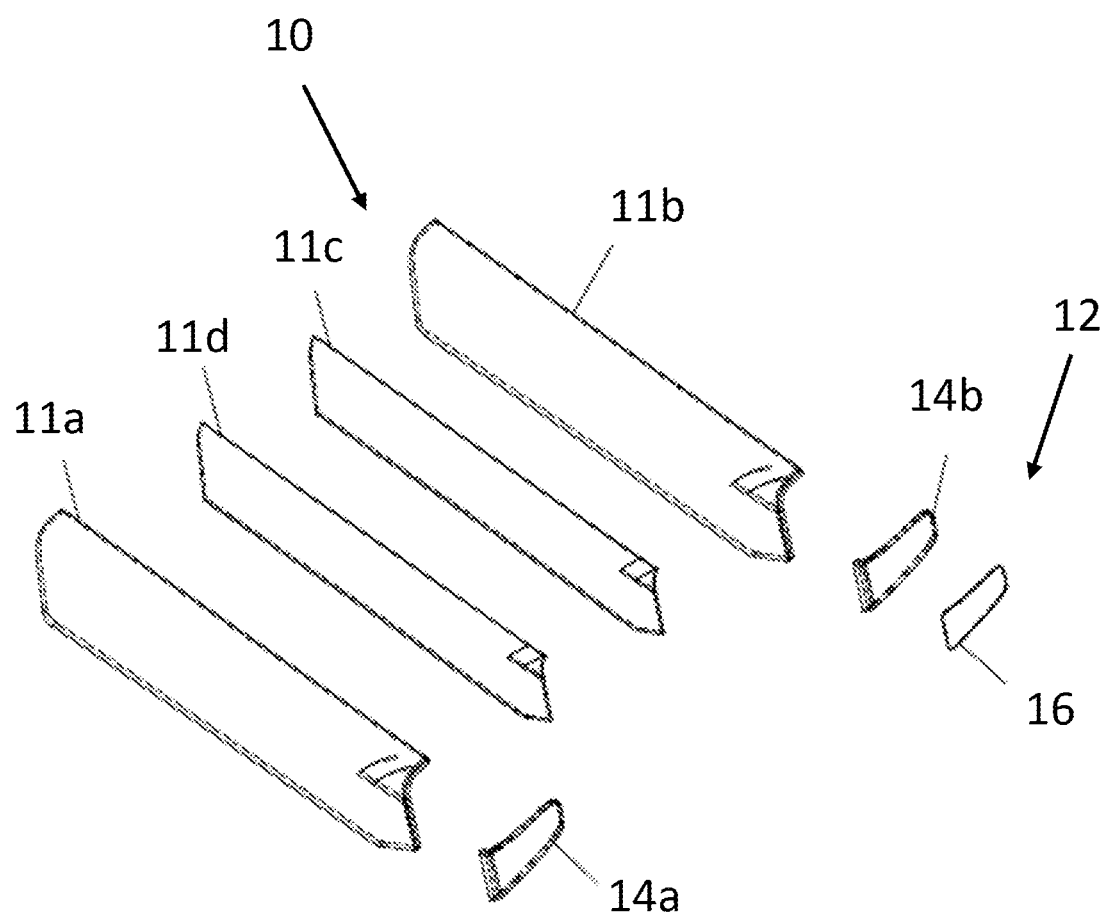
FIG. 3 shows a view of the construction of the covering element, which is designed to be layered, and of the tab-shaped element as individual parts.

In FIG. 2 and FIG. 3, the intermediate states between fully covered and fully uncovered are shown. These states are adopted, in particular, when the covering element 10 is transferred between a covering state and an uncovering state.

The covering element 10 is designed to be strip-shaped and has the shape of a rectangle with two short side edges 10c and two long side edges. The long side edges form a first and second side edge 10a, 10b. The covering element 10 is dimensioned such that it fully covers the two fastening means of the holding device 6 or the openings 8 of the receiving channels 8a in the covering position.

The covering element 10 is of multi-layered construction and has a first and a second outer face 11a, 11b which are designed from the same material as the seat outer skin 5 of the vehicle seat. Thus, on the one hand, production of the covering element 10 is provided in a simple manner with little effort since the same materials are used as for producing the surface of the seat surface 2 and/or the backrest 3. On the other hand, a homogenous view of the vehicle seat 1 is ensured when the covering element 10 is in the uncovering position and in the covering position.

The layered construction of the covering element 10 comprises an adhesive layer in the form of an adhesive non-woven material 11c and a reinforcing layer 11d, preferably a stable non-woven interlining, between the first and second outer face 11a, 11b.

The covering element 10 is unreleasably fastened to the backrest 3 via the first side edge 10a. In this case, the first side edge 10a is arranged so as to run spaced apart from the seat surface 2 in the transverse direction. The fastening to the first side edge 10a takes place via a transversely running seam (transverse seam) which unreleasably connects the side edge 10a to the seat outer skin 5 or the seat cover 4 of the backrest 3. The second side edge 10b of the covering element opposing the first side edge 10a is releasably arranged on the backrest. As a result, the covering element 10, which functions as a flap, may be pivoted about a pivot axis S1 running in the transverse direction on the first side edge 10a on the backrest 3 into the covering position and the uncovering position.

In the covering position of the covering element 10, shown in FIG. 1, the fastening means and the openings 8 or receiving channels 8a are fully covered. The first long side edge 10a forms an upper transverse edge and the second side edge 10b forms a lower transverse edge.

In the uncovering position shown in FIG. 2, the covering element 10 is pivoted upwardly about the pivot axis S1, whereby the openings 8 and receiving channels 8a in the backrest are uncovered, and it is possible to fasten a child seat. In this pivoted-up position of the covering element 10, the second side edge 10b is the upper side edge and the covering element 10 is located with its first outer face 11a on the surface region 5a of the backrest 3. The second outer face 11b then forms the visible side for a user.

As may be identified from the drawings, a tab-shaped element 12 is attached to one of the two short side edges 10c. The attachment of the tab-shaped element 12 in this case is such that the tab-shaped element 12 is held so as to be pivotable via a pivot axis S2 on the short side edge 10c running in the z-direction. Preferably, the tab-shaped element 12 is fastened to the short side edge 10c via a seam.

The tab-shaped element is of multi-layered construction and has a first and a second outer face 14a, 14b which are designed from the same material as the seat outer skin 5 of the vehicle seat. The layered construction of the tab-shaped element 12 comprises a reinforcing layer 16 between the first and second outer face 14a, 14b, and this reinforcing layer 16 is preferably a plastic panel made of polypropylene.

If the covering element 10 is located in the covering position shown in FIG. 1, the covering element 10 is fixed via the tab-shaped element 12 which is pivoted into a first position and inserted into a channel or slot in the backrest 3 or between the backrest 3 and the adjacent backrest element or the seat surface 2 and side support 3b, and held clamped therein.

For fastening a child seat and displacing the covering element 10 from the covering position into the uncovering position, a user may simply release the covering element from the covering position by preferably gripping the covering element 10 on the second side edge and pivoting upwardly about the pivot axis S1. In this case, the clamped tab-shaped element is automatically released from the slot/channel. In the uncovering position of the covering element 10, the tab-shaped element 12 may be pivoted to the rear about the pivot axis S2 into a second position so that a fixing of the covering element 10 may be achieved in the "uncovering position". The tab-shaped element 12 in this case is inserted into a slot/channel in the backrest 3 or between the backrest 3 and an adjacent side part, for example a further backrest part of a divided backrest.

In a further embodiment, not shown, naturally it is also possible that the covering element 10 is unreleasably attached via the long side edge 10a to the seat surface 2 about a pivot axis S1. To this end, the covering element 10 is stitched on the side edge 10a by means of a transverse seam to the seat cover 4 or the seat outer skin.

It is known to provide a vehicle seat of a motor vehicle of the second seat row with a divided backrest, having backrest elements which are pivotable independently of one another. As a result, starting from a use position of the seat part, it is possible to pivot the backrest elements onto the seat part into a loading position to provide a loading surface.

Figure 4:
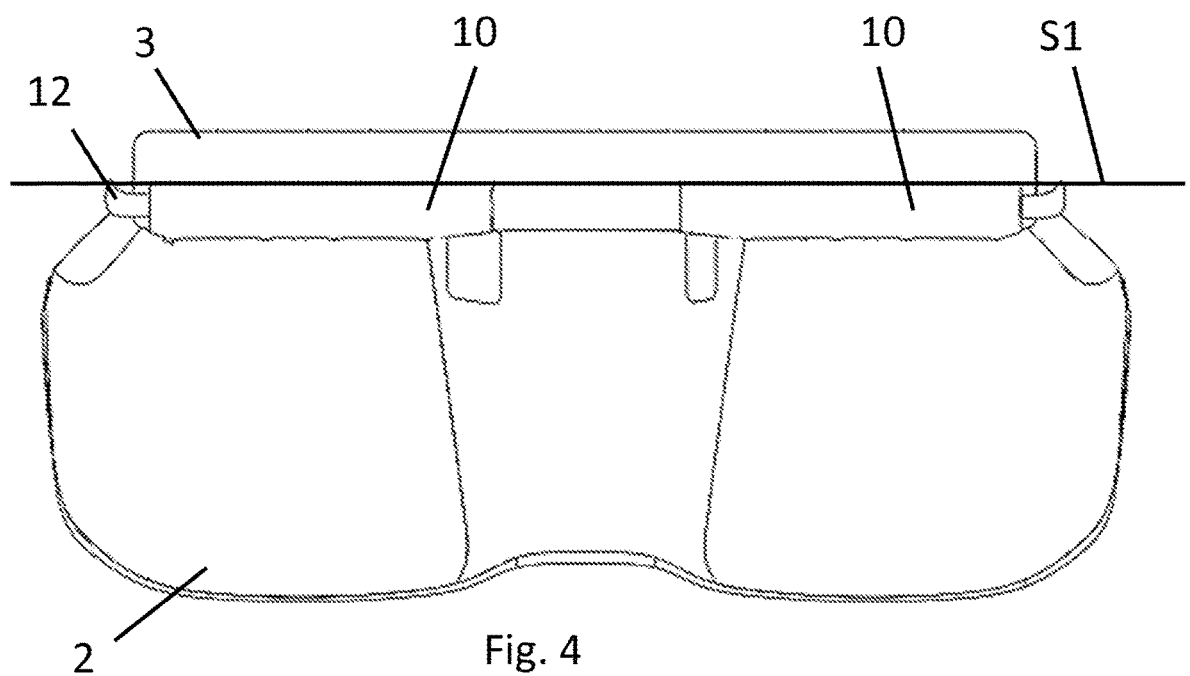
FIG. 4 shows a plan view of a seat support of a vehicle seat of the second seat row with a backrest divided 40:20:40, two holding devices with assigned covering elements to the right/left.

As may be identified from the view of FIG. 4, such a vehicle seat 1 of the second seat row comprises a one-piece seat surface with three seats and a backrest 3 with three backrest elements divided asymmetrically in the ratio 40:20:40. As may also be identified, the outer seats are provided with holding devices for fastening a child seat. Accordingly, the assigned backrests are designed with one respective covering element 10.

Figure 5:
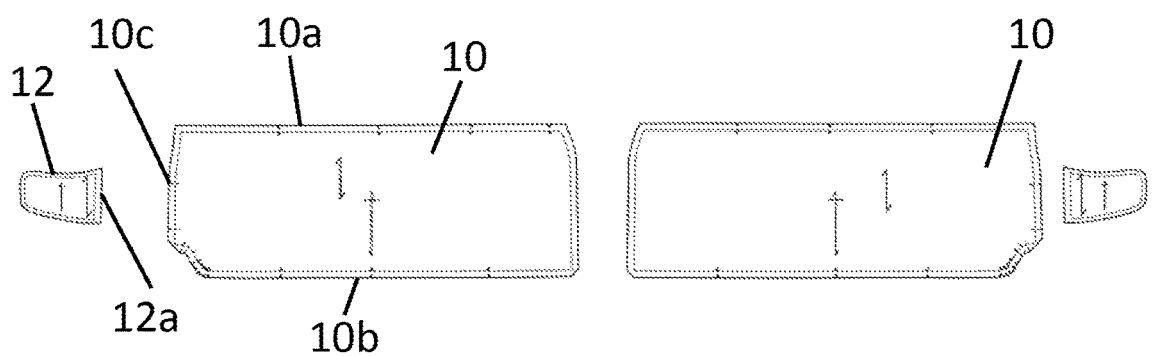
FIG. 5 shows the covering elements according to FIG. 4 with tab-shaped elements as individual parts.

FIG. 5 shows the covering elements 10 with tab-shaped elements 12 in a plan view as individual parts. As already mentioned, the tab-shaped elements 12 are stitched onto a short side edge 12c.

This division and design of the seat arrangement with the seat surfaces and backrest elements 1 is only by way of example at this point.

A corresponding vehicle 10, not shown, has a vehicle seat 1 as described above. It is provided by way of example that a child seat is positioned on the vehicle seat 10, said child seat preferably being arranged on two fastening means via two connectors as counter elements. The counter elements and fastening means form in this case the ISOFIX fastening system. If the child seat is not used, visually the vehicle has a high-quality interior due to the covering elements 10 having the tab-shaped elements, since the two fastening means or the assigned receiving channels which are arranged spaced apart from one another are provided with the strip-shaped covering element 10 and the tab-shaped element 12 and covered by the same surface as the seat backrest 3 and/or the seat surface 2. The vehicle seat 1 is, in particular, a vehicle seat of the second seat row or a sub-region of a seat support of a second seat row of the vehicle.

What is claimed is:

1. A vehicle seat comprising:
a seat surface and a backrest, wherein this seat surface and backrest comprise a seat cover with a seat outer skin;
a holding device which is rigidly arranged on the vehicle seat for releasably attaching an additional device, wherein the holding device comprises two fastening elements;
openings in the seat surface or the backrest for reaching the fastening elements;
a covering element which is configured to be strip-shaped and which comprises two short side edges and a first and a second long side edge, wherein the covering element is of multi-layered construction and has at least one first outer face which is designed from the same material as the seat outer skin of the vehicle seat, wherein the covering element is unreleasably attached via a first side edge to the seat surface or the backrest, such that the covering element is able to be selectively brought into a covering position for covering the fastening means, and into an uncovering position for uncovering the fastening means and the openings, and wherein the covering element is unreleasably attached via the first long side edge by means of a transverse seam to the seat outer skin or the seat cover on the seat surface or the backrest, wherein the transverse seam forms a first pivot axis for the covering element; and
a tab-shaped element that is attached to at least one of the short outer edges about a second pivot axis, such that in the covering position the tab-shaped element is able to be pivoted about the short outer edge into a first position and is able to be inserted into a channel or slot in the backrest or seat surface or between the backrest and the seat surface for the releasable fixing of the covering element, and in the uncovering position the tab-shaped element is able to be pivoted into a second position and is able to be inserted into a channel or a slot in the backrest or seat surface or between the backrest and seat surface for the releasable fixing of the covering element.

2. The vehicle seat according to claim 1, wherein the covering element has the following multi-layered construction: cover material, stable non-woven interlining, adhesive non-woven material, cover material, and wherein the cover material forms the first outer face and a second outer face of the covering element and consists of a leather material, textile material, synthetic leather, or microfibre.

3. The vehicle seat according to claim 1, wherein the tab-shaped element is stitched to one of the short side edges of the covering element for forming the first pivot axis.

4. The vehicle seat according to claim 1, wherein the tab-shaped element is of multi-layered construction and has a first outer face and a second outer face which are designed from the same material as the seat outer skin of the vehicle seat.

5. The vehicle seat according to claim 4, wherein the multi-layered construction comprises a reinforcing layer between the first and second outer faces of the tab-shaped element.

6. The vehicle comprising a vehicle seat according to claim 1.

7. A vehicle seat, comprising:
a seat surface and a backrest;
two fastening elements rigidly arranged on the vehicle seat for releasably attaching to an additional device;
one of the seat surface or the backrest defining openings for reaching the fastening elements;
a covering element comprising two short side edges and two long side edges;
the covering element being attached via one of the side edges to the seat surface or the backrest along a first pivot axis, such that the covering element is able to be selectively brought into a covering position in which the covering element covers the fastening means, and into an uncovering position in which the covering element does not cover the fastening means; and
a tab-shaped element attached to at least one of the short outer edges along a second pivot axis, such that in the covering position of the covering element the tab-shaped element is able to be pivoted about the short outer edge into a first position for releasably fixing the covering element to the back rest and/or seat surface, and wherein in the uncovering position, the tab-shaped element is able to be pivoted about the short outer edge into a second position for releasably fixing the covering element to the back rest and/or seat surface.

8. The vehicle seat according to claim 7, wherein the covering element has the following multi-layered construction: cover material, stable non-woven interlining, adhesive non-woven material, cover material, wherein the cover material forms first and second outer faces of the covering element and consists of a leather material, textile material, synthetic leather, or microfibre.

9. The vehicle seat according to claim 7, wherein the tab-shaped element is stitched to a short side edge of the covering element for forming the second pivot axis.

10. The vehicle seat according to claim 7, wherein the tab-shaped element is of multi-layered construction and has a first and a second outer face which are designed from the same material as a seat outer skin of the vehicle seat.

11. The vehicle seat according to claim 10, wherein the multi-layered construction of the tab-shaped element comprises a reinforcing layer between the first and second outer faces of the tab-shaped element.

* * * * *